United States Patent
Wang et al.

(10) Patent No.: US 12,430,469 B2
(45) Date of Patent: Sep. 30, 2025

(54) SECURE WORKFLOWS FOR GENERATING AND APPLYING DIGITAL COMPONENT DISTRIBUTION DIRECTIVES

(71) Applicant: Google LLC, Mountain View, CA (US)

(72) Inventors: Gang Wang, Frederick, MD (US); Jacob Mark Hallberg, Sunnyvale, CA (US); Rishav Anand, Mountain View, CA (US); Raghava Hassan Nanjunda Swamy, Mountain View, CA (US); Mengjie Xia, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 18/388,374

(22) Filed: Nov. 9, 2023

(65) Prior Publication Data
US 2024/0184925 A1    Jun. 6, 2024

Related U.S. Application Data

(60) Provisional application No. 63/429,842, filed on Dec. 2, 2022.

(51) Int. Cl.
G06F 9/44 (2018.01)
G06F 21/62 (2013.01)

(52) U.S. Cl.
CPC ...... *G06F 21/6263* (2013.01); *G06F 21/6281* (2013.01)

(58) Field of Classification Search
CPC .................. G06F 21/6263; G06F 21/6281
See application file for complete search history.

(56) References Cited

U.S. PATENT DOCUMENTS

| | | | |
|---|---|---|---|
| 7,483,893 B2 | 1/2009 | McVeigh et al. | |
| 7,844,488 B2 | 11/2010 | Merriman et al. | |
| 8,290,905 B1 * | 10/2012 | Little | H04L 51/42 715/764 |
| 10,032,191 B2 | 7/2018 | Harrison | |

(Continued)

FOREIGN PATENT DOCUMENTS

WO    WO 2022197304    9/2022

OTHER PUBLICATIONS

International Search Report and Written Opinion in International Appln. No. PCT/US2023/037081, mailed on Feb. 13, 2024, 17 pages.

(Continued)

*Primary Examiner* — Hang Pan
(74) *Attorney, Agent, or Firm* — Fish & Richardson P.C.

(57) ABSTRACT

Methods, systems, and apparatus, including computer programs encoded on a computer storage medium, for securely executing customized computing workflows for selecting digital components are described. In one aspect, a method includes receiving a request for a digital component for presentation by a client device. In response to receiving the request, a pool of candidate digital components is retrieved from a repository of digital components, and each stage of a multi-stage workflow for selecting a digital component from the pool of digital components is executed in a sequence defined by the multi-stage workflow, including a filtering stage, a selection stage, and a rendering stage. After the rendering stage has been executed, a selected and packaged digital component is transmitted for receipt by the client device.

20 Claims, 6 Drawing Sheets

(56) References Cited

U.S. PATENT DOCUMENTS

| | | |
|---|---|---|
| 10,049,391 B2 | 8/2018 | Buchalter et al. |
| 10,354,276 B2 | 7/2019 | Schnobeiri et al. |
| 10,445,781 B2 | 10/2019 | Nolet et al. |
| 10,997,632 B2 | 5/2021 | Segalov et al. |
| 11,276,088 B1 | 3/2022 | Saifee et al. |
| 11,354,682 B2 | 6/2022 | Jha et al. |
| 2011/0321167 A1 | 12/2011 | Wu et al. |
| 2016/0357536 A1* | 12/2016 | Firlik .................. G06F 8/61 |
| 2018/0121964 A1* | 5/2018 | Zhang ............ G06Q 30/0277 |
| 2019/0172090 A1 | 6/2019 | Fukuda et al. |
| 2022/0172183 A1 | 6/2022 | Wong et al. |
| 2022/0269744 A1* | 8/2022 | Balasubramanian .................. G06F 16/951 |

OTHER PUBLICATIONS

International Preliminary Report on Patentability in International Appln. No. PCT/US2023/037081, mailed on Jun. 12, 2025, 11 pages.

* cited by examiner

SECURE WORKFLOWS FOR GENERATING AND APPLYING DIGITAL COMPONENT DISTRIBUTION DIRECTIVES

CROSS-REFERENCE TO RELATED APPLICATIONS

This application claims the benefit under 35 U.S.C. § 119(e) of U.S. Patent Application No. 63/429,842, filed Dec. 2, 2022. The disclosure of the foregoing application is incorporated herein by reference in its entirety for all purposes.

TECHNICAL FIELD

This specification relates to securely executing computing workflows for generating and applying digital component distribution directives, in ways that enhance data security and data privacy.

BACKGROUND

Data security is vital for computing systems connected to public networks, such as the Internet. Computer systems are often protected from unauthorized access and data breaches using network security technologies, such as firewalls.

A virtual machine provides an emulated version of a computer system. A virtual machine can include emulated processing units (e.g., a central processing unit (CPU)), memory, network interfaces, and/or other computing components.

Content platforms can be used to identify and provide digital components for presentation with digital media. Sometimes, data associated with client device users is shared (e.g., in the form of cookies or other data) for the purpose of selecting and serving user-focused content.

SUMMARY

This specification describes technologies related to securely performing workflows for directing the selection and distribution of digital components in a distributed computing environment. The workflow technologies can enable non-disclosed and otherwise proprietary customization of the stages of the workflow in ways that prevent other parties from accessing the customization. A workflow is a set of executable stages through which a unit of work passes from initiation to completion. The technologies include performing workflows in isolated environments, e.g., in virtual machines, that provide secure sandboxes while still supporting full-function workflows. The techniques can further include constraints on inputs to and/or outputs from workflows or portions thereof to maintain user privacy, prevent access to confidential customizations, and enhance system integrity.

In general, one innovative aspect of the subject matter described in this specification can be embodied in methods for securely executing customized computing workflows for selecting digital components, including the operations of receiving, from a client device, a request for a digital component for presentation by the client device; in response to receiving the request for the digital component, retrieving, from a repository of digital components, a pool of candidate digital components; executing each stage of a multi-stage workflow for selecting a digital component from the pool of candidate digital components in a sequence defined by the multi-stage workflow, the executing comprising: during a filtering stage, for each candidate digital component of the pool of candidate digital components, executing computer code for a filtering stage customization that has previously been received from a content platform that corresponds to the candidate digital component, wherein the computer code for the filtering stage customization is configured to perform filtering of digital components based at least in part on distribution directives of a provider of the candidate digital component; after the filtering stage, during a selection stage, for each remaining candidate digital component of the pool of candidate digital components, executing computer code for a selection stage customization that has previously been received from a content platform that corresponds to the remaining candidate digital component, wherein the computer code for the selection stage customization is configured to perform generating or modifying of selection values for digital components based at least in part on distribution directives of a provider of the remaining candidate digital component; selecting one of the remaining candidate digital components, based on the selection values; and after the selection stage, during a rendering stage, for the selected digital component, executing computer code for a rendering stage customization that has previously been received from a content platform that corresponds to the selected digital component, wherein the computer code for the rendering stage is configured to perform packaging of the selected digital component for presentation by the client device; and after the rendering stage, transmitting the selected and packaged digital component for receipt by the client device. Other implementations of this aspect include corresponding apparatus, systems, and computer programs, configured to perform the aspects of the methods, encoded on computer storage devices.

These and other implementations can each optionally include one or more of the following features. In some aspects, the computer code for the filtering stage customization, the computer code for the selection stage customization, and the computer code for the rendering stage customization are each executed in separate virtual machines.

In some aspects, the computer code for the filtering stage customization, the computer code for the selection stage customization, and the computer code for the rendering stage customization for a first content platform is executed in a first virtual machine, and the computer code for the filtering stage customization, the computer code for the selection stage customization, and the computer code for the rendering stage customization for a second, different content platform is executed in a second, different virtual machine.

In some aspects, the filtering of digital components comprises (i) accessing the distribution directives of the provider of the candidate digital component, wherein the distribution directives include a target value for digital component deliveries and an actual delivery value, (ii) comparing the target value for digital component deliveries to the actual delivery value, and (iii) filtering a given digital component when the actual delivery value meets the target value for digital component deliveries.

In some aspects, the modifying of selection values for digital components comprises (i) accessing the distribution directives of the provider of the candidate digital component, wherein the distribution directives include a target value for digital component deliveries and an actual delivery value, (ii) determining a current delivery ratio, wherein the current delivery ratio is the actual delivery value relative to the target value, (iii) determining a current time period ratio, wherein the current time period ratio is an amount of time that has elapsed in a current time period relative to a length of the current time period, and (iv) increasing the selection value of a given digital component when the current delivery ratio is less than the current time period ratio.

In some aspects, selecting one of the remaining candidate digital components comprises selecting a given candidate digital component that has a highest selection value relative to other candidate digital components.

In some aspects, packaging of the selected digital component comprises packaging the selected digital component with one or more code elements that facilitate presentation of the selected digital component by the client device, and with one or more code elements that facilitate a transmission of notification data for the selected digital component.

In some aspects, the methods include (i) receiving, from the client device, notification data associated with presentation of the selected and packaged digital component by the client device, and (ii) using the notification data to update the distribution directives of the provider of the selected and packaged digital component.

Particular embodiments of the subject matter described in this specification can be implemented so as to realize one or more of the following advantages. The techniques described in this document can be used to select digital components from a variety of content providers (e.g., content platforms) while preserving the privacy of the requestor. In addition, the techniques enable such digital components to be provided by content platforms while also preserving the confidentiality and integrity of techniques and proprietary logic used by the content platforms. As described further below, the system can execute stages of a workflow that is used to determine digital components, with stages that involve sensitive user data and/or confidential techniques and/or logic being executed in a virtual machine or in other appropriate isolated environments. Executing code in a virtual machine protects the privacy of both the content requestor since the virtual machine can constrain access to information about the requestor. Executing code in a virtual machine protects the content platform that supplied the code since the virtual machine can ensure that the content platform's proprietary customizations remain isolated such that other content platforms never have access to the content platform's customizations. The techniques can include encrypting code for the customizations, which ensures the security, confidentiality, and integrity of the code. The techniques can also be used to ensure that data produced by stages of a workflow meet validity criteria. Such criteria can further protect requestor privacy by ensuring that stages only provide data to other stages and to content platforms that satisfies privacy constraints. Different content platforms can specify different customization code for evaluating various distribution directive factors, and the code can be individually and securely executed to protect confidential logic of the content platforms. By filtering candidate digital components during an initial filtering stage, a number of candidate digital components under consideration during subsequent stages can be reduced, thus conserving computer processing resources and ensuring faster processing times. A customizable, closed-loop mechanism can be provided for content platforms to control the rate of digital component deliveries, without exposing user data to the content platforms, and without the computer code for controlling the delivery being executed on the servers of the content platforms.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
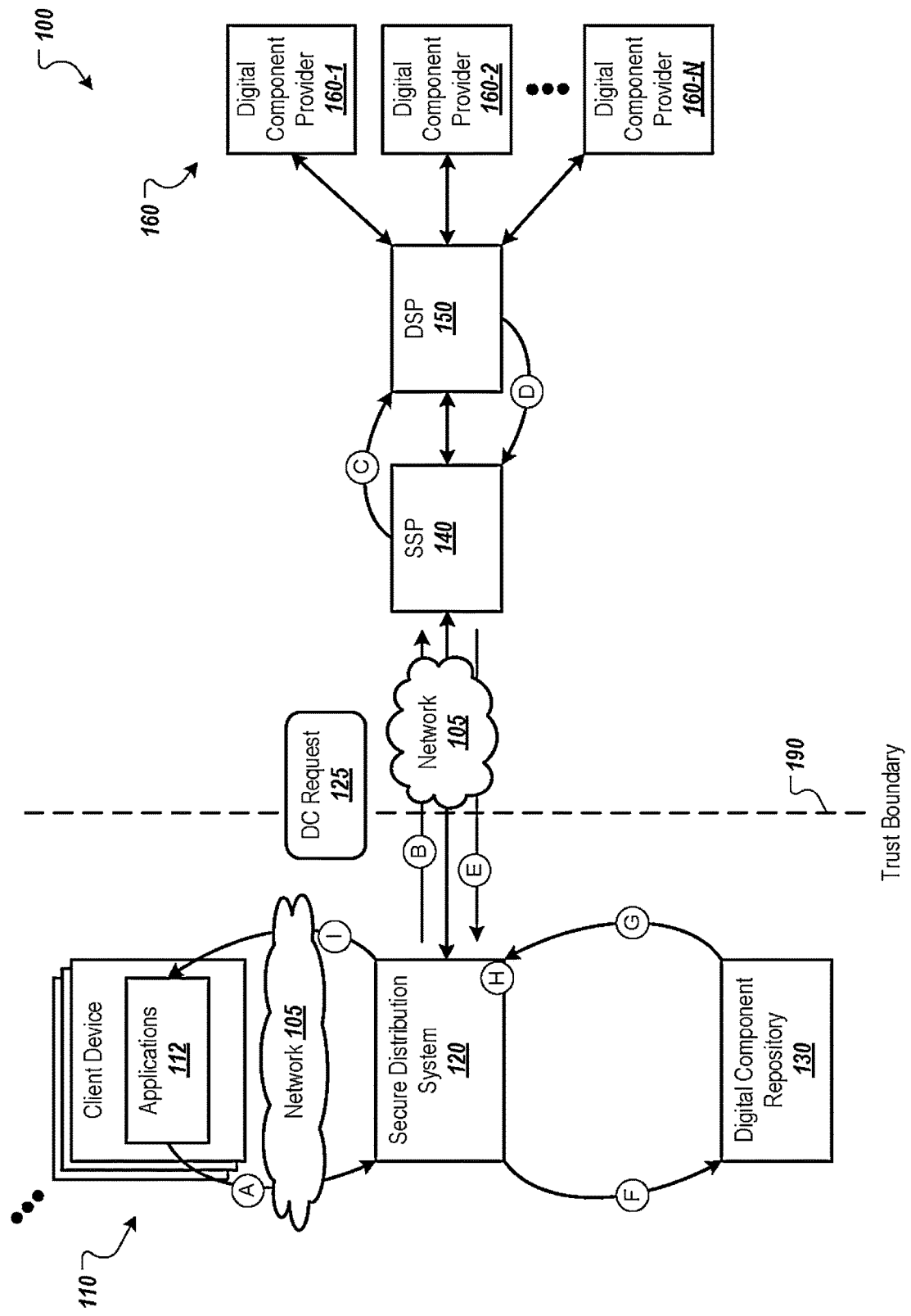
FIG. 1 shows an example environment in which a secure distribution system distributes digital components to client devices in a privacy preserving manner.

In general, this document describes systems and techniques for selecting and distributing digital components to client devices in ways that protect user privacy and confidential data of content platforms and/or digital component providers. A secure distribution system can be configured to perform digital component selection processes that use sensitive user data so that the user data is not provided to any other entity. The secure distribution system can host and execute selection logic of various content platforms when selecting digital components based on user data in manners that ensure that no other entity can access the selection logic of the content platform. In this way, both the data of the users and the content platforms is kept secure.

Ensuring the privacy of personal data is a requirement of many computing systems, especially those connected to public networks such as the Internet. Some consumers who do not trust that strong privacy protection will be enforced by a system will simply choose not to use that system. In addition, some jurisdictions have regulations that protect privacy. Such privacy guarantees can include not only how data is stored, but also processes that control data sharing with third parties.

However, some data sharing can provide utility to data consumers, especially when a consumer authorizes specific sharing. For example, private data, including aggregate private data, can be used to locate content that is both relevant and interesting to the data consumer, if the user authorizes such uses of the user's data. Absent information about the data consumer, it can be challenging for a system to provide relevant information.

One solution to balancing privacy and utility is to enable a "data custodian" to retain private data with a guarantee that the data are only used for authorized purposes. Such authorization can include which content platforms can use the data, how often, for what purpose, and so on. When a data consumer requests content, a data custodian can execute code provided by content platforms, and the result can be the selection and presentation of content that is of interest or otherwise relevant to the data consumer. In such cases, the data custodian can execute code on behalf of content platforms, and that code can use authorized subsets of the private data, but the content platforms never actually receive the private data.

However, code or other types of logic (e.g., rules) of content platforms can be a valuable business asset of the content platform. Such code can contain differentiating innovations that result in the selection of more relevant content for data consumers. For that reason, content platforms can be reluctant to provide their code to a data custodian.

In addition, executing code from multiple content platforms can create integrity issues. For example, one content platform might attempt to share data with another content platform that is not authorized to access the data. In another example, a content platform might attempt to use their code to determine how the code of another content platform operates. Thus, a need exists to ensure overall system integrity while still allowing non-disclosed, proprietary code to operate on private data.

This specification describes a workflow system that enables content platforms to execute code for each stage of the workflow, or for a subset of stages, in a virtual machine, and the result of the workflow can be recommended content. Such code supplied by a content platform to implement a stage can be called a "customization." To preserve privacy, the system can ensure that each customization is permitted to access only data that does not violate privacy constraints, and that the results generated by each customization satisfies validity constraints. In addition, the system can execute each customization in a separate virtual machine, ensuring that each customization is executed in isolation. Further, content platforms can encrypt their customizations before providing them to the system. Encrypting customizations, then executing them in isolation provides protection to these valuable data assets. In addition, encryption ensures the integrity of the customization by ensuring that customizations cannot undergo tampering before arriving at the workflow system.

FIG. 1 is a block diagram of an example environment 100 in which a secure distribution system 120 distributes digital components to client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to the secure distribution system 120 and connects the secure distribution system 120 to content platforms, such as supply side platforms (SSPs) 140 and/or demand side platforms (DSPs) 150. The network 105 can also connect the various content platforms to one another and/or to digital component providers 160, e.g., to servers of the digital component providers 160.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request 125 that requests a digital component for presentation in the digital component slot. In some implementations, the digital component slot and/or the resource can include code (e.g., scripts) that cause the application 112 to request a digital component from the secure distribution system 120.

A digital component request 125 sent by a client device 110 can include sensitive user data related to a user of the client device 110 and/or non-sensitive data, such as generic keywords and/or a query string. The sensitive user data can include, for example, data identifying user groups that include the user as a member. The user groups can include interest-based groups. Each interest-based group can include a topic of interest and a set of members identified (e.g., determined or predicted) to be interested in the topic. The user groups can also include, for example, groups of users that performed particular actions at electronic resources (e.g., websites or native applications) of publishers. For example, a user group can include users that visited a website, users that requested more information about an item, interacted with (e.g., selected) a particular digital component and/or added an item to a virtual cart to potentially acquire the item. The user data for a user can also include user profile data and/or attributes of the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A digital component request 125 can also include contextual data, which is generally considered non-sensitive. The contextual data can describe the environment in which a selected digital component will be presented. The contextual data can include, for example, coarse location information indicating a general location of the client device 110 that sent the digital component request 125, a resource (e.g., website or native application) with which the selected digital component will be presented, a spoken language setting of the application 112 or client device 110, the number of digital component slots in which digital components will be presented with the resource, the types of digital component slots, and other appropriate contextual information.

The secure distribution system 120 can be implemented using one or more server computers (or other appropriate computing devices), that may be distributed across multiple locations. In general, the secure distribution system 120 receives requests for digital components from client devices 110, selects digital components based on data included in the requests, and sends the selected digital components to the client devices 110.

As the secure distribution system 120 receives sensitive user data, the secure distribution system 120 can be operated and maintained by an independent trusted party, e.g., a party that is different from the users of the client devices, the parties that operate the SSPs 140 and DSPs 150, and the digital component providers 160. For example, the secure distribution system 120 can be operated by an industry group or a governmental group.

As described in more detail below, the secure distribution system 120 can select a digital component from a set of digital components stored in a digital component repository 130 and/or a set of digital components received from an SSP 140. The digital component repository 130 stores digital components received from content platforms (e.g., from SSPs 140 and/or DSPs 150) and additional data (e.g., metadata) for each digital component. The metadata for a digital component can include, for example, distribution criteria that defines the situations in which the digital component is eligible to be provided to a client device 110 in response to a digital component request received from the client device 110 and/or a selection value that indicates an amount that will be provided to the publisher if the digital component is displayed with a resource of the publisher and/or interacted with by a user when presented. For example, the distribution criteria for a digital component can include location information indicating geographic locations in which the digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations). Other data that can be used to select a digital component can also be stored in the digital component repository with a reference (e.g., a link or as metadata) to its digital component.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create (or otherwise publish) digital components that are presented in digital component slots of publisher's resources.

In this example, user data does not cross a trust boundary 190 that separates the client device 110, the secure distribution system 120, and the digital component repository 130 from the SSP 140, DSP 150, and digital component providers 160. In this way, no entity other than the client device 110 and the secure distribution system 120 receives the user data that is included in a digital component request 125. This preserves user privacy and data security, especially when compared to techniques that employ third party cookies to send user data across the Internet.

An example process for selecting and providing a digital component for presentation at a client device 110 is illustrated in stages A-I, which illustrate a flow of data between the components of the environment 100.

In stage A, the application 112 sends a digital component request 125 to the secure distribution system 120. As described above, the application 112 can send a digital component request to request a digital component for presentation in a digital component slot of a resource being presented by the application 112. The digital component request 125 can include user data and contextual data.

In stage B, the secure distribution system 120 sends a context-based digital component request to an SSP 140. The context-based digital component request 125 can include the contextual data of the digital component request 125 received from the application 112. However, the context-based digital component request 125 does not include any of the user data. The secure distribution system 120 can temporarily store the user data while waiting for a response from the SSP 140. The secure distribution system 120 can send the context-based digital component request 125 to an SSP 140 for the publisher of the resource being presented by the application 112.

In stage C, the SSP 140 forwards the context-based digital component request 125 to one or more DSPs 150. In stage D, each DSP 150 sends, to the SSP 140, one or more selection parameters (e.g., including selection values) for one or more digital components, e.g., digital components stored in the digital component repository 130. For example, the DSP 150 can determine the one or more selection parameters for the digital component and/or select a digital component based on the contextual data of the context-based request. In some implementations, the DSP 150 can provide a digital component instead of or in addition to providing the one or more selection parameters, e.g., a digital component that is not stored in the digital component repository 130. In some implementations, each DSP 150 can send the one or more selection parameters with data indicating the digital component to which the selection parameter(s) apply. The digital components for which selection parameters are provided by the DSPs 150 (and/or which are directly provided by the DSPs 150) can be referred to as context-based digital components.

In stage E, the SSP 140 sends the digital components and/or selection parameters to the secure distribution system 120. In some implementations, the SSP 140 can filter digital components and/or selection parameters prior to sending the digital components and/or selection parameters to the secure distribution system 120. For example, the SSP 140 can filter digital components and/or selection parameters based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In stage F, the secure distribution system 120 queries the digital component repository 130 for a set of user-based digital components that are selected based on the user data of the digital component request 125. For example, the secure distribution system 120 can submit a query that defines, as conditions of the query, the user data of the digital component request 125. In some implementations, the query can also include context-based conditions. For example, a query can request retrieval of digital components that include, as distribution criteria, a particular user group and/or a particular geographic location. Although shown after stages B-E, the secure distribution system 120 can query the digital component repository 130 in parallel with these stages to reduce the latency in selecting and providing a digital component to the application 112.

In stage G, the secure distribution system 120 receives a set of user-based digital components from the digital component repository 130 and a selection parameter for each user-based digital component. The set of user-based digital components can include those having distribution criteria that matches the conditions of the query.

In stage H, a selection engine 122 of the secure distribution system 120 selects a digital component to provide to the application 112 for presentation in the digital component slot. The selection engine 122 can select a digital component from the set of context-based digital components and the user-based digital components. The selection engine 122 can select the digital components from the two sets based on the selection value for each digital component in the two sets. For example, the selection engine 122 can select the digital component having the highest selection value.

In stage I, the secure distribution system 120 provides the selected digital component to the application 112. The application 112 can then present the digital component with the resource being presented by the application 112.

Figure 2:
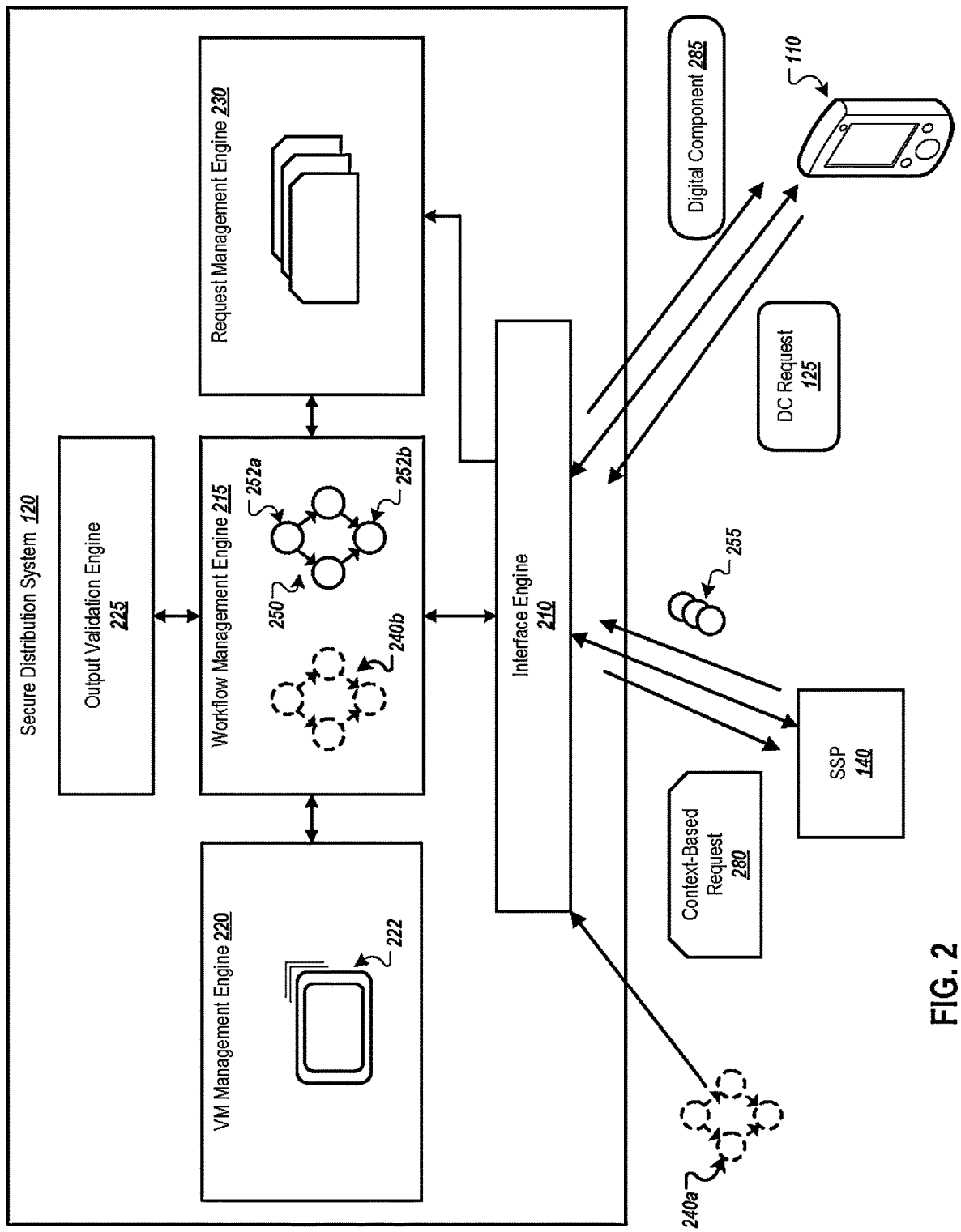
FIG. 2 shows components of the secure distribution system of FIG. 1 in more detail.

FIG. 2 shows components of the secure distribution system 120 of FIG. 1 in more detail. In general, the secure distribution system 120 can receive digital component requests 125 from client devices 110, securely execute workflows 250, and provide digital components 285 to client devices 110. The secure distribution system 120 can include an interface engine 210, a workflow management engine 215, a virtual machine (VM) management engine 220, an output validation engine 225 and a request management engine 230.

The interface engine 210 is configured to accept workflow specifications 240a, customizations 255 and digital component requests 125, and can provide digital components 285 and/or references to digital components 285, e.g., Uniform Resource Locators (URLs), which enable client devices 110 to download the referenced digital components 285 from servers. The interface engine 210 can include an application programming interface (API) that is configured to accept data (e.g., workflow specification 240a, customizations 255 and digital component requests 125) provided to the secure distribution system 120 and to provide data (e.g., digital components 285) to other components in the environment 100 of FIG. 1.

A workflow specification 240a, 240b (collectively workflow specification 240) can define the structure of a workflow, and can include a description of stages 252a, 252b (collectively stages 252) of a workflow, including interconnections among the stages 252 and constraints on the inputs and outputs to a stage 252.

A workflow specification 240 can be instantiated into a particular workflow 250 by the workflow management engine 215, and the same workflow specification 240 can be instantiated multiple times into multiple workflows 250, e.g., for multiple content platforms—i.e., workflow management engine 215 can execute workflows 250 instantiated from a single workflow specification 240 for each of multiple content platforms. Each content platform can provide customizations 255 that provide implementations for stages 252 of the workflow 250 executed by the secure distribution system 120 on their behalf. As described further below, to provide privacy of user data, in some implementations, each stage 252 of a workflow 250 can be executed in a separate virtual machine instance 222, and in some implementations, all stages of a workflow 250 executed on behalf of a content platform are executed in a single virtual machine instance 222. The workflow specification 240 can use any appropriate technique for defining a workflow structure. For example, a workflow can be described as a graph where nodes of the graph are stages 252 of the workflow, and edges in the graph show inputs and outputs to stages 252. In some workflows, outputs from one stage become inputs to another stage 252, or to multiple other stages 252, and stages 252 can also obtain inputs for sources other than another stage 252. In addition, output from a stage 252 can be processed before it becomes input to another stage 252. For example, output can be validated before it is passed to another stage 252, as described further below.

A workflow specification 240 can include default code for any subset of the workflow stages 252, for none of the stages 252, or for all of the stages 252. The default code provides a base implementation of the stage, reducing the coding burden for parties providing customizations 255 that do not wish to provide customizations 255 for all stages 252. A workflow specification 240 can also include indications that particular stages cannot be overridden or otherwise customized, and the default code must always be used for the stage. Stages in a workflow specification 240 that can be overridden can be called "customization points."

For example, the secure distribution system 120 can perform a digital component selection process to select digital components to provide to client devices 110 based on user data and/or other data, such as distribution criteria for each digital component, contextual data, and/or other appropriate data. The digital component selection process can have multiple stages 252 defined by a workflow specification 240. The overall sequence of stages can be rigid such that there are no customizations by content platforms (e.g., SSPs 140 and/or DSPs 150). However, the processes performed in some stages may be customized by the content platforms. For example, the digital component selection process can have a stage in which a digital component request 125 is processed to extract data from the request 125. This stage may be a default stage in which default code that cannot be customized by content platforms is used by the workflow management engine 215. A later stage can include obtaining candidate digital components and corresponding selection parameters. At this stage, the workflow management engine 215 can execute customizations provided by the content platforms to select the candidate digital components and generate the corresponding selection parameters. As the logic provided by the content platforms is typically considered confidential, this logic can be securely stored by the secure distribution system 120 and can execute in isolated environments, e.g., within content platform specific virtual machines, as described in more detail below. After the candidate digital components are obtained, the workflow management system 215 can perform one or more additional stages to select a digital component 285 from the candidate digital components to provide to the client device 110 from which the digital component request 125 was received.

In some implementations, metadata can be included in, or associated with, the workflow specification 240. Such metadata can include, but is not limited to, the author of the workflow specification 240, its version, time of creation, owner, etc. The metadata can also include criteria that indicate whether the workflow defined by the workflow specification 240 is appropriate for a digital component request 125. For example, one workflow specification 240 might be appropriate for requests for textual digital components 285 while a different workflow specification 240 is appropriate for requests for multimedia digital components 285. The secure distribution system 120 can use such metadata to select a workflow specification 240 appropriate for a particular digital component request 125. The metadata can also include an identifier for the workflow specification 240.

A customization 255 can be computer-executable instructions that define the operation of a stage 252 of a workflow 250. The instructions for a customization 255 can be expressed as executable instructions (e.g., bytecode) and/or in any appropriate programming language, including scripting languages, and different customizations 255 can be expressed in any combination of executable instructions and programming languages, which can be different programming languages. For example, customizations 255 can be specified as C, C++, Python, and/or other example types of code.

Customizations can be grouped into workflow descriptions, where a workflow description is an implementation of a workflow specification 240, or a portion of a workflow specification 240, and more specifically, workflow descriptions can include one or more customizations 255, each implementing a customization point in a workflow specification 240. A customization 255 can also include one or more identifiers that specify the stage in a workflow specification that the customization implements. For example, if a workflow specification 240 includes stages A, B, C and D, a content platform can provide workflow descriptions that contain customizations 255 for stages A, B, C and D or some portion thereof. When the secure distribution system 120 instantiates, on behalf of a content platform, a workflow specification 240 into a workflow 250, the secure distribution can use the customizations 255 for each of stages A, B, C and D provided by the content platform. To simplify the management of the customizations, a content provider can group the customizations 255 into a workflow description or the content provider can provide the customizations 255 individually.

The workflow management engine 215 can execute workflows as specified by workflow specifications 240 and customizations 255. The workflow management engine 215 can obtain a virtual machine (VM) instance 222 from the VM management engine 220, and instruct the virtual machine instance 222 to execute the instructions as specified by the customization 255. A VM instance 222 can emulate the operation of a physical computing device, while isolating the instructions performed by the VM from the computing device and from other VM instances. In cases where no customization 255 exists for a stage 252, the VM instance 222 can execute default code for the stage 252 as specified by the workflow specification 240. Executing customizations 255 in VM instances 222 provides isolation of customization 255 both from customizations 255 provided by other content providers, and from resources in the secure distribution system 120 to which a customization 255 is forbidden to access.

The VM management engine 220 can create VM instances 222, destroy VM instances 222, and assign VM instances 222 to workflow stages 252, among other VM management operations. The VM management engine 220 can include an API, which, when called by the workflow management engine 215, causes the VM management engine 220 to create a VM instance 222 and provide a reference to the VM instance 222 to the workflow management engine 215. The workflow management engine 215 can assign the VM instance 222 to a stage 252 of a workflow 250, and execute the instructions for the stage 252 (which can be a customization 255) in the VM instance 222.

The output validation engine 225 can accept output from the stage 252 of a workflow, which can be implemented by a customization 255, and determine whether the output satisfies criteria imposed on the output. In various implementations, the criteria are included in the workflow specification 240; the criteria are configured into the workflow management engine 215, e.g., by an authorized administrator of the secure distribution system 120; and/or the workflow management engine 215 obtains the criteria using other techniques, such as reading them from a storage device. If the output validation engine 225 determines that an output does not satisfy the criteria, the output validation engine can indicate to the workflow management engine 215 that the workflow 250 should be halted.

The criteria can be expressed in any suitable format and can be expressed using any property of the output and/or any property of the system. For example, the criteria can be expressed as Boolean expressions. Criteria can include types of values produced (e.g., the output must be an integer, floating point number, string, array, Boolean, etc.), ranges of values produced (e.g., a value must be between a minimum and maximum value), limits of values produced (e.g., a value cannot exceed a threshold value), and so on. Criteria can be expressed for specific content platforms, for classes of content platforms (e.g., providers of images or providers of multimedia), for all content platforms, etc.

The request management engine 230 can accept digital component requests 125 from the interface engine 210, and can provide the request 125 (or data from the request 125) to the workflow management engine 215. A digital component request 125 can be any appropriate specification of content. For example, a digital component request 125 can be a query string, and can include user data and/or context data provided by a client device 110, as described above. The workflow management engine 215 can use the digital component request 125 and metadata associated with workflow specifications 240 to determine an appropriate workflow specification 240 for the digital component request 125. For example, if the request is for an image, the workflow management engine 215 can select a workflow configured to select digital components 285 that are in the form of, or that include, images.

Figure 3:
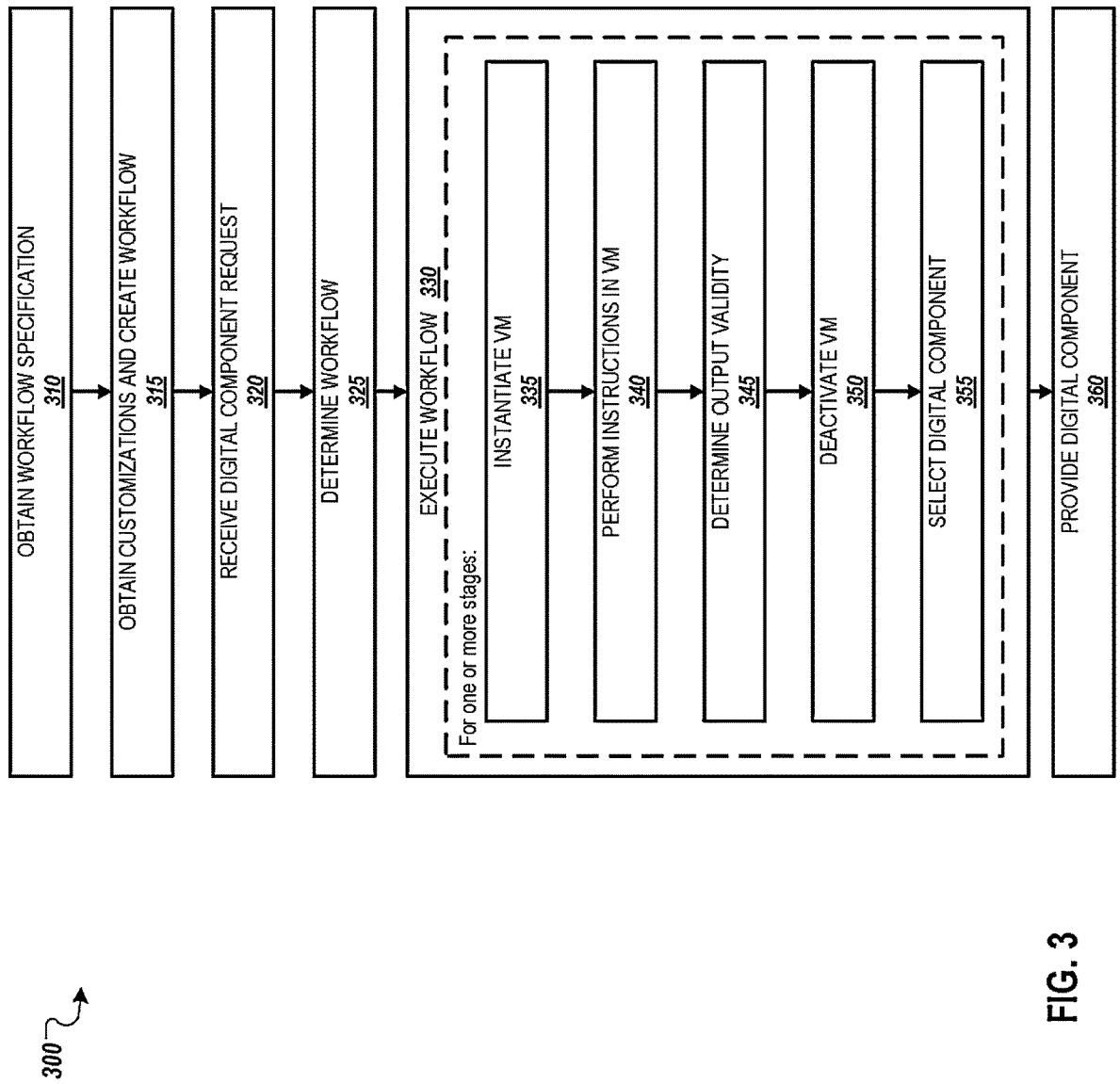
FIG. 3 is a flow diagram of an example process for executing secure workflows for content selection.

FIG. 3 is a flow diagram of an example process 300 for executing secure workflows for content selection. For convenience, the process 300 will be described as being performed by a system for executing secure workflows for content selection, e.g., the secure distribution system 120 of FIGS. 1 and 2, appropriately programmed to perform the process. Operations of the process 300 can also be implemented as instructions stored on one or more computer readable media which may be non-transitory, and execution of the instructions by one or more data processing apparatuses can cause the one or more data processing apparatuses to perform the operations of the process 300. One or more other components described herein can perform operations of the process 300.

The system obtains (310) a workflow specification. For example, the system can include an API that is configured to accept workflow specifications. In another example, the system can accept data containing the workflow specification over a network, e.g., data passed using Transmission Control Protocol/Internet Protocol (TCP/IP), Hypertext Transfer Protocol (HTTP) or HTTP-Secure (HTTP-S). In still another example, the system can obtain a workflow specification from a storage device, using an API that is appropriate for the storage device, or from a database using Structured Query Language (SQL). As noted above, the workflow specification can define the structure of a workflow and can include, in some examples, default code for stages of the workflow.

The system obtains (315) customizations, which can be included in one or more workflow descriptions. The system can obtain customizations using any appropriate technique. For example, the system can accept customizations included in data received over a networking protocol such as TCP/IP, HTTP or HTTP-S. In another example, the system can include an API, which, when called by parties such as content providers, enables the parties to provide customizations. As described above, each customization can be configured to implement a stage of a workflow specification. Multiple parties, which can be content platforms, can provide customizations, and parties can provide multiple workflow descriptions, each configured to implement the stages of a different workflow specification.

In some implementations, to secure the workflow description, a customization can be encrypted by the submitting party and decrypted by the system using any appropriate encryption technique. For example, the system can publish a public key (e.g., by storing the public key at a known, accessible location). Submitting parties can obtain the public key, encrypt the customization (or multiple customizations in a workflow description) using the public key, and provide the encrypted customization and/or encrypted workflow description to the system. The system can decrypt the encrypted customization and/or workflow description using its private key that corresponds to the public key used by the submitting party.

The system can create a workflow from the workflow specification and the customizations. As described above, customizations can include an identifier of the stage of a workflow specification that the customization implements. For each stage included in the workflow specification, the system can include the default code for the stage from the workflow specification, and for customization points (i.e., stages of the workflow specification that can be overridden), replace the code for the stage with code included in the corresponding customization. If the system obtains a customization for a stage that is not a customization point, the system can ignore the customization and/or provide an error message.

The system receives (320) a request for a digital component using any appropriate technique. For example, the system can receive the digital component request 125 over HTTP or SQL. As described above, a digital component request 125 can contain a description of the digital component requested (e.g., a search string), user data, and/or contextual data, as described above.

In response to receiving the request, the system determines (325) a multi-stage workflow for selecting personalized content from candidate content of multiple content platforms. As described above, the metadata associated with a workflow specification can include criteria that indicate whether the workflow is appropriate for a particular digital component request 125. The system can determine whether the criteria are satisfied to determine a workflow for execution. For example, criteria might specify that a workflow specification is appropriate for requests for image content relating to sports that are received from a particular geographical region, and the system can evaluate the criteria associated with the workflows to select a workflow appropriate for requests for image content.

The system executes (330) each stage of the multi-stage workflow to determine at least one output value. Executing the workflow can include various operations, as described below.

For at least a subset of the content platforms that provided stages, which can be customizations, relevant to a digital component request 125, the system can execute the stages of the workflow determined in operation 325. Executing a stage can include instantiating (335) a VM instance configured to isolate a set of executable instructions provided by the content platform (e.g., the customization for the stage). The system can instantiate a VM instance using a hypervisor that is configured to instantiate VM instances or using any other suitable techniques for instantiating VM instances. The system can then execute the code for the stage in a VM instance. Thus, in some implementations, the system executes each stage in a separate, isolated VM instance. For example, the system can execute, for each customizable stage, the customization of each content platform for that stage in its own separate and isolated VM. Such a system provides isolation among all stages, regardless of whether they were provided by a single content platform or multiple content platforms. In addition, in some implementations, the system can execute multiple stages provided by a given content platform in a single VM instance. Using a single VM instance to execute multiple stages can reduce the computational requirements of the computing system by reducing the number of required VM instances.

The system performs (340) the executable instructions of the stage within the VM to determine at least one output value. The system, for example, can include one or more execution environments (e.g., Java Virtual Machines, JavaScript engines, and Python engines, among other alternatives) that are configured to perform executable instructions, which can determine an output value used to select the digital component. In some implementations, the workflow can include multiple stages, where the end stage selects a digital component directly from a set of candidate digital components, and the output of intermediate stages can influence the operation of the end stage (e.g., by selecting the candidates and/or generating selection parameters for the candidates), thereby influencing the selection of the digital component. As described above, the workflow specification and customizations can include code specified using any appropriate programming language or as executable instructions such as bytecode. The results of each stage can be returned to the system for delivery to the next stage and/or for use selecting a digital component. The results of a stage can also be evaluated using validity criteria, as described below.

When executing within a VM, implementations of stages can access input data necessary for performing the stage. The input data can be stored in any appropriate format and can be stored on any appropriate storage device. For example, the input data can be stored as (key, value) pairs, where the stage accesses data by providing a key, and the system can provide the value associated with the key. In various implementations, the input data can be stored in a database and obtained using SQL queries and/or stored in a file system and accessed using a file system API.

The system can provide access control for the (key, value) pairs. For example, each (key, value) pair can be associated with an access control list, and the system can provide the (key, value) pair only if the content platform that provided a customization is included in the access control list. The system can obtain the access control list from an authorized administrator or using other suitable technique for obtaining access control lists. In some implementations, a content platform can provide a collection of (key, value) pairs, and the system permits access to such collections only for the content platform that provided the collection, or to other content platforms explicitly authorized by the content platform that provided the collection.

To limit system resources consumed on behalf of a content platform, resources consumed on behalf of any subset of content platforms, or on behalf of all content platforms, the system can enforce limits on resources consumed by the entire workflow, by a subset of stages in a workflow, or by any workflow stage. Such limits can be valuable, for example, when the system is executed on a server or group of servers that provide a multi-tenant environment, and the server or servers ensure that computing resources consumed by any given tenant does not exceed a configured threshold, leaving sufficient computing resources available for other tenants. This can also reduce the overall workload on the system, which can extend the life of processing components of the system. Resources can include any operational metric such as processor time (e.g., by a Central Processing Unit(s) (CPUs), Graphics Processing Units (GPUs), Digital Signal Processor(s) (DSP), Application Specific Processor(s) (ASPs), etc.), memory use, storage use, and network use, among other operational metrics. The system can enforce limits, which can be expressed as constraints, on any aspect of resource use such as aggregate use, peak use, rate of use over some time period, and so on. Limits can also be combined in any logical combination. For example, a limit can specify a maximum peak use and a limit on aggregate use. The limits can be enforced on a particular stage, on a group of stages, on an entire workflow, on all workflows provided by a content provider, by collections of content providers, and/or on other singular or aggregate entities. If a limit is met, the system can perform a remediating action. Such actions can include, but are not limited to, terminating or delaying operation of a stage or workflow.

When a stage completes execution, the system determines (345) the validity of one or more of the output values produced by the stage. In situations in which multiple VMs are used in a stage, e.g., when there is a separate VM for each content platform for that stage, the system can determine the validity of the output(s) of each VM. As described above, criteria used to determine the validity of output can be included in the workflow specification and/or configured into the system. Such criteria can protect requestor privacy by ensuring that stages only provide data to other stages and to content providers that satisfies constraints, which can include privacy constraints. The system can evaluate the criteria using the output value to determine whether the criteria are satisfied. As described above, criteria can be expressed as function of the type of output, value or values of the output, and so on.

The VM management engine can deactivate (350) the VM using any appropriate technique for deactivating a VM. For example, the system can instruct a hypervisor to deactivate the VM. Deactivating the virtual machine removes all state of the computation done by the stage, thereby ensuring the stage does not provide unauthorized content to another stage.

In response to determining that the output value is valid (e.g., as determined in operation 245), the virtualized workflow engine determines (355) a result at least in part based on the first output value from each VM. The result can be a digital component or a descriptor for a digital component. The descriptor can include a reference to one or more digital components (e.g., as indicated by a URL or URI) that are present at, or provided by, a content platform, and/or a descriptor that can be used by a content platform to determine a digital component. For example, the descriptor can include any metadata describing the digital component, such as a category of information requested (e.g., sports, fashion, news, science, etc.), depersonalized information about the requestor (e.g., general categories of demographic data such as age range, location, etc.), characteristics of the device (e.g., phone or laptop), and so on.

The system can provide (360) the result to the client device of the requestor, to the content provider or to both. When the result is a digital component provided to the client device of the requestor, the client device can present the digital component using an interface of the client device. When the result is a descriptor for a digital component, the client device can retrieve the digital component (e.g., using HTTP to retrieve a digital component specified by a URL) and present the digital component using the interface of the client device.

In addition, in cases where the descriptor is provided to the requestor and not to the content provider, the system can provide to the content platform an indication that the content from the provider was selected. Such information can allow a content provider to determine the popularity of digital components provided by the provider. The content provider can also use such information to refine the operation of its customizations.

Figure 4:
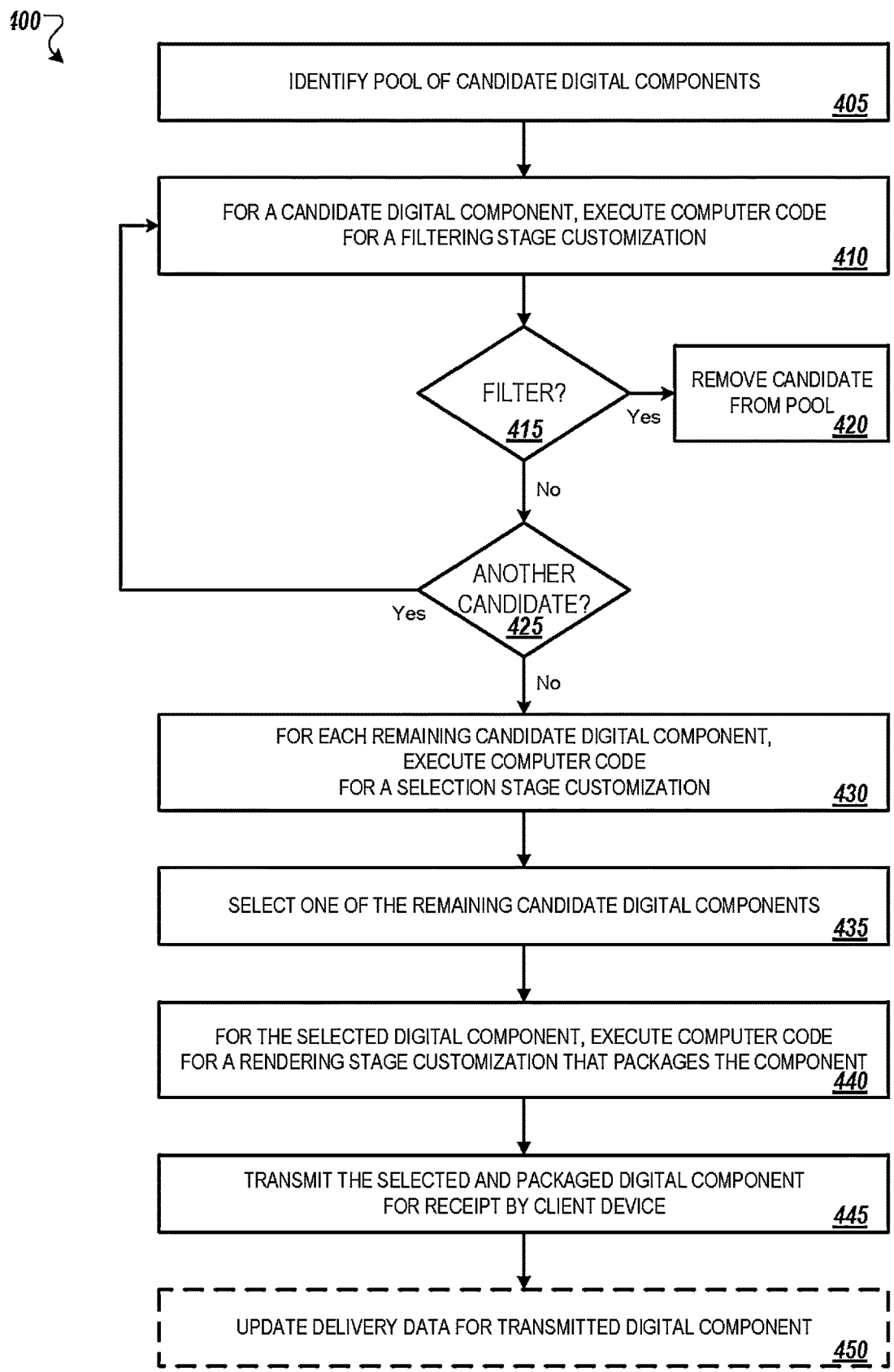
FIG. 4 is a flow diagram of an example process for generating and applying digital component distribution directives when distributing digital components.

FIG. 4 is a flow diagram of an example process 400 for generating and applying digital component distribution directives when distributing digital components. For convenience, the process 400 will be described as being performed by a system for executing secure workflows for content selection, e.g., the secure distribution system 120 of FIGS. 1 and 2, appropriately programmed to perform the process. Operations of the process 400 can also be implemented as instructions stored on one or more computer readable media which may be non-transitory, and execution of the instructions by one or more data processing apparatuses can cause the one or more data processing apparatuses to perform the operations of the process 400. One or more other components described herein can perform operations of the process 400.

Figure 5:
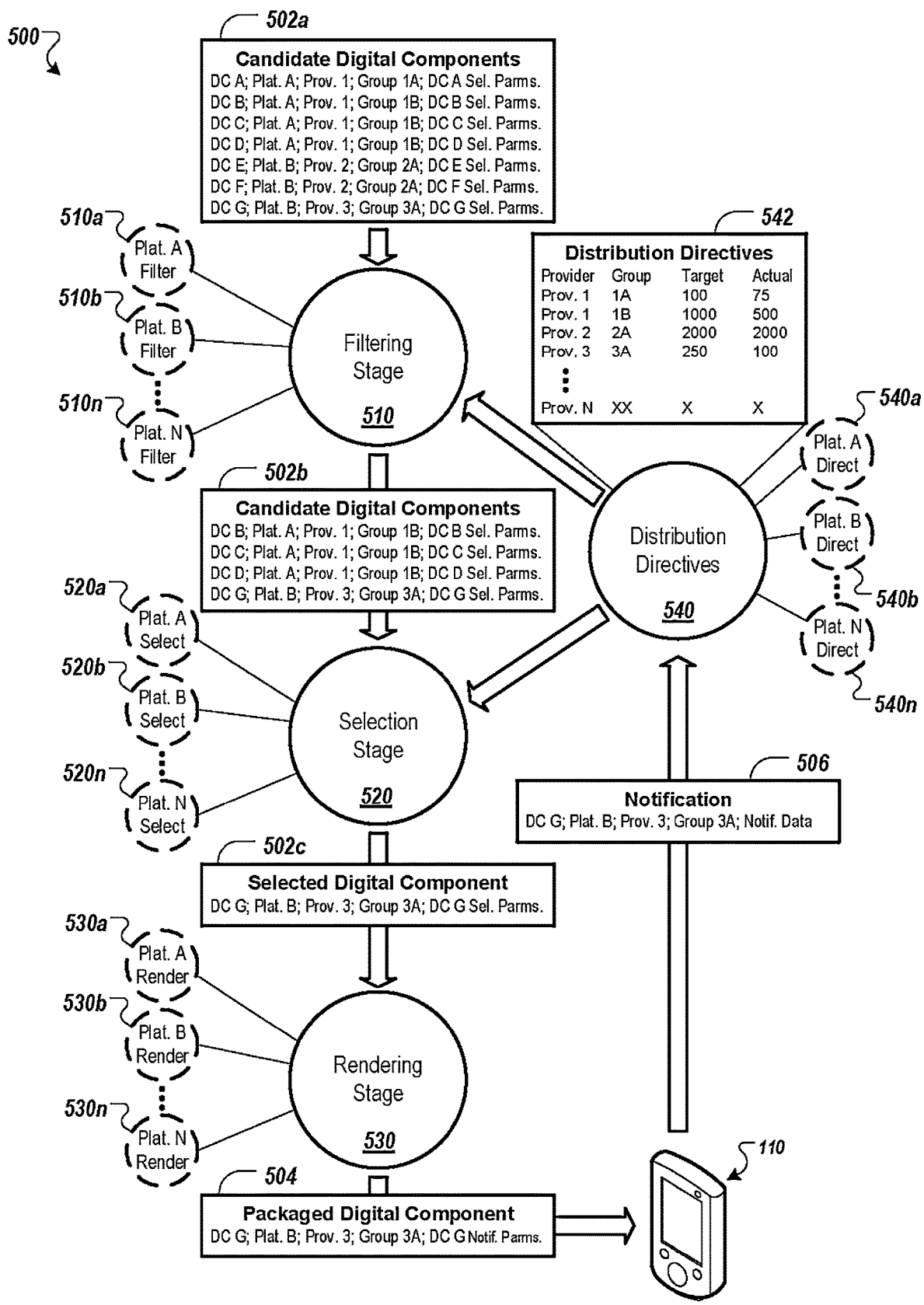
FIG. 5 is a conceptual diagram that shows customizable stages used for generating and applying digital component distribution directives when distributing digital components.

The system identifies a pool of candidate digital components (405). For example, after receiving the digital component request 125, the secure distribution system 120 can retrieve candidate digital components from the digital component repository 130 (e.g., during stage F, shown in FIG. 1). Referring now to FIG. 5, for example, a pool of candidate digital components 502a can be identified by the secure distribution system 120. In the present example, the pool of candidate digital components 502a includes digital components A-G. Each candidate digital component, for example, can be associated with a digital component platform (e.g., DSP 150, shown in FIG. 1, or another DSP) and/or a digital component provider (e.g., one of the digital component providers 160-1-N, also shown in FIG. 1), can belong to a digital component group (e.g., digital components that have been specified by a platform or provider as being grouped and managed together, such as digital components of a presentation campaign), and can be associated with one or more selection parameters (e.g., metadata including selection values and/or other parameters specified by the digital component platform or provider). In the present example, Digital Component A (DC A) is associated with Platform A (also referred to as a first platform) and Provider 1, and belongs to Group 1A; Digital Components B-D are each associated with Platform A and Provider 1, and belong to Group 1B; Digital Components E-F are each associated with Platform B (also referred to as a second platform) and Provider 2, and belong to Group 2A; and Digital Component G is associated with Platform B and Provider 3, and belongs to Group 3A.

After identifying the pool of digital components 502a, for example, the secure distribution system 120 can execute stages of a multi-stage workflow for selecting a digital component from the pool in a sequence defined by the multi-stage workflow. In general, executing each of the stages can include executing customization code for the stage that has previously been received from a content platform that corresponds to a candidate digital component. As described above, for example, separate virtual machines can be implemented for each content platform's customizations, and the customizations can be executed in sandboxed environments that prevent the customizations from sending user data to the content platforms.

For a candidate digital component, the system executes computer code for a filtering stage customization (410). Referring again to FIG. 5, for example, conceptual diagram 500 shows customizable stages 510, 520, 530, and 540 used for generating and applying digital component distribution directives when distributing digital components. As will be described in examples below, customization code (e.g., precompiled bytecode) can be provided for each of the customizable stages by each of multiple different content platforms, such that confidentiality of the proprietary logic employed by the content platforms is preserved. In general, during a filtering stage 510, for each candidate digital component of the pool of candidate digital components, the secure distribution system 120 can execute computer code for a filtering stage customization that has previously been received from a content platform that has provided the candidate digital component. For example, before identifying the pool of candidate digital components 502a, the secure distribution system 120 can receive code for the filtering stage customization, from multiple different content platforms (e.g., multiple different DSPs 150). In the present example, the secure distribution system 120 can access filtering stage customization code 510a for digital components of Platform A, filtering stage customization code 510b for digital components of Platform B, and filtering stage customization code 510n for digital components of Platform N.

In some implementations, the computer code for the filtering stage customization can be configured to filter a digital component, based at least in part on distribution directives of a provider of the digital component. For example, each digital component provider can specify a target value for digital component deliveries (e.g., a delivery count, a cumulative total value for the deliveries, or another suitable target value), over a specified time period (e.g., a current hour, day, week, etc.) for its digital components, and can provide the specified target value to the secure distribution system 120. As another example, various content platforms can provide executable computer code for a distribution directive customization 540 (e.g., distribution directive customization code 540a for Platform A, distribution directive customization code 540b for Platform B, and distribution directive customization code 540n for Platform N), and the secure distribution system 120 can execute the computer code to determine distribution directives for a digital component provider. In the present example, Provider 1 Group 1A has a delivery target value of 100, Provider 1 Group 1B has a delivery target value of 1000, Provider 2 Group 2A has a delivery target value of 2000, and Provider 3 Group 3A has a delivery target value of 250.

In addition to maintaining delivery target values for digital component providers, for example, the secure distribution system 120 can maintain actual delivery values for digital components of the providers over a specified time period. For example, in response to receiving notifications of digital component deliveries (and/or actions that may result from the deliveries), the secure distribution system 120 can update the actual delivery values (e.g., by incrementing counters, by adding to a cumulative value, etc.) that correspond to the delivery target values. Notifications, for example, can include impression notifications (e.g., the digital component being presented by a client device), interaction notifications (e.g., a user of the client device interacting with the digital component by selecting the component, or performing another sort of interaction), conversion notifications (e.g., the user of the client device performing an action that can be attributed to the digital component, such as navigating to a web page, installing an application, or performing another sort of action), or other suitable notifications. In the present example, Provider 1 Group 1A has an actual delivery value of 75, Provider 1 Group 1B has an actual delivery value of 500, Provider 2 Group 2A has an actual delivery value of 2000, and Prover 3 Group 3A has an actual delivery value of 250.

The system determines whether to filter the candidate digital component (415). In general, a filtering determination can result in a Boolean value, in which a given digital component is either filtered (e.g., removed from the pool of candidate digital components 502a) or is not filtered (e.g., not removed from the pool of candidate digital components). For each candidate digital component in the pool of candidate digital components 502a, for example, the secure distribution system 120 can execute computer code for a customization of the filtering stage 510. In the present example, filtering stage customization code 510a can be executed for each of the candidate Digital Components A-D (e.g., digital components that have been provided by Platform A), and filtering stage customization code 510b can be executed for each of the candidate Digital Components E-G (e.g., digital components that have been provided by Platform B).

In some implementations, determining whether to filter a candidate digital component based on distribution directives can include comparing a target value for digital component deliveries to an actual delivery value. When determining whether to filter a given candidate digital component, for example, the secure distribution system 120 can generate and/or access (e.g., using a key-value store, with an optional version identifier to ensure consistent data across the multi-stage process 510, 520, 530) distribution directives that specify a delivery target value and an actual delivery value for a current time period (e.g., a current hour, day, week, etc.), for digital components of a provider of the digital components, at a provider and/or group level. In the present example, for Digital Component A, the secure distribution system 120 can use the filtering stage customization code 510a of Platform A to access the distribution directives 542 for Provider 1 Group 1A (e.g., based on metadata associated with Digital Component A). According to the distribution directives, for example, Provider 1 Group 1A has a delivery target value of 100 and an actual delivery value of 75.

In some implementations, a delivery target value, an actual delivery value, an amount of time that has elapsed in a current time period, and a length of the current time period can be considered, possibly among other factors, when determining whether to filter a candidate digital component. Further, different content platforms can specify different customization code for evaluating the various factors and determining whether to filter the digital component, and the code can be individually and securely executed to protect confidential logic of the content platforms. For example, the filtering stage customization code 510a of Platform A can compare a current delivery ratio (e.g., an actual delivery value relative to a delivery target value) to a current time period ratio (e.g., an amount of time that has elapsed in a current time period relative to a length of the current time period), and can apply a probabilistic throttling technique to adjust the delivery of digital components such that digital components are delivered at relatively even rates throughout the time period. In the present example, a current time period may be 50% complete, however, the actual delivery of digital components is 75% of the delivery target value. Since the current delivery ratio exceeds the current time period ratio in the present example, delivery of Digital Component A can be probabilistically throttled (e.g., by generating a random value and filtering the digital component when the random value does not meet a predetermined threshold value). As another example, the filtering stage customization code 510a of Platform A can filter digital components that are associated with selection values of zero. In the present example, Digital Component A can be filtered from the pool of candidate digital components 502a.

Similarly, for each of Digital Components B-D, the secure distribution system 120 can use the filtering stage customization code 510a of Platform A to access the distribution directives 542 for Provider 1, Group 1B (e.g., based on metadata associated with each of Digital Components B-D). According to the distribution directives, for example, Provider 1 Group 1B has a delivery target value of 1000 and an actual delivery value of 500. Since the actual delivery value is less than the delivery target value for digital components of Provider 1 Group 1B in the present example (and since the current delivery ratio for digital components of Provider 1 Group 1B substantially matches the current time period ratio), Digital Components B-D can remain unfiltered from the pool of candidate digital components 502a.

For each of digital components E-G, for example, the secure distribution system 120 can use the filtering stage customization code 510b of Platform B to access the distribution directives 542 for Provider 2 Group 2A, and for Provider 3 Group 3A (e.g., based on metadata associated with each of digital components E-G). According to the distribution directives, for example, Provider 2 Group 2A has met its delivery target (e.g., its actual delivery value of 2000 meets its delivery target value of 2000), however Provider 3 Group 3A has not yet met its delivery target (e.g., its actual delivery value of 100 does not meet its delivery target value of 250). Thus, in the present example, each of the candidate digital components E-F can be filtered from the pool of candidate digital components 502a, whereas digital component G can remain unfiltered from the pool of candidate digital components 502a.

As describe in examples above, in response to determining that the candidate digital component is to be filtered, the system removes the candidate digital component from the pool of candidate digital components (420). In the present example, candidate Digital Component A from Provider 1 Group 1A, and candidate Digital Components E-F from Provider 2 Group 2A can be filtered from the pool of candidate digital components 502a, such that candidate Digital Components B-D from Provider 1 Group 1B, and Digital Component G from Provider 3 Group 3A remain in the pool (here shown as pool 502b). By filtering candidate digital components during an initial filtering stage 510, for example, a number of candidate digital components under consideration during subsequent stages can be reduced, thus conserving computer processing resources and ensuring faster processing times.

The system determines whether another candidate digital component is in the pool of candidate digital components (425). If additional candidate digital components exist in the pool of candidate digital components 502a, for example, each candidate digital component can be evaluated in view of its distribution directives 542 (e.g., during stages 410 and 415), and can optionally be removed from the pool (e.g., during stage 420). After the candidate digital components have each been evaluated, for example, the process 400 can continue.

For each candidate digital component that remains in the pool of candidate digital components after a filtering stage, the system executes computer code for a selection stage customization (430). For example, during a selection stage 520, for each candidate digital component that remains in the pool of candidate digital components 502b after the filtering stage 510 (e.g., the candidate digital components that were not filtered from the pool during the filtering stage 510), the secure distribution system 120 can execute computer code for a selection stage customization that has previously been received from a content platform that has provided the candidate digital component. For example, before identifying the pool of candidate digital components 502a and generating the filtered pool of candidate digital components 502b, the secure distribution system 120 can receive code for the selection stage customization, from multiple different content platforms (e.g., multiple different DSPs 150). In the present example, the secure distribution system 120 can receive and execute selection stage customization code 520a for each of the remaining candidate Digital Components B-D (e.g., digital components that have been provided by Platform A), and can receive and execute selection stage customization code 520b for the remaining candidate Digital Component G (e.g., a digital component that has been provided by Platform B).

In some implementations, the computer code for the selection stage customization can be configured to generate and/or modify one or more selection values for a digital component, based at least in part on distribution directives of a provider of the digital component. For example, each digital component provider can specify selection values and/or data for generating and/or modifying the selection values for its digital components, and the selection values and/or data can be provided by the content platforms (e.g., DSP 150) to the secure distribution system 120 (e.g., during stage C, shown in FIG. 1). In general, a selection value for a digital component can indicate an amount that will be provided to a publisher if the digital component is displayed with a resource of the publisher and/or interacted with when presented. When selecting a digital component for distribution, for example, the secure distribution system 120 can compare the selection values of multiple different candidate digital components, and can select a digital component with a highest selection value.

In some implementations, generating and/or modifying a selection value for a digital component based on distribution directives can include comparing a target value for digital component deliveries to an actual delivery value. When generating and/or modifying a selection value for a given digital component, for example, the secure distribution system 120 can generate and/or access (e.g., using a key-value store with an optional version identifier) the distribution directives 542. In the present example, for Digital Components B-D, the secure distribution system 120 can use the selection stage customization code 520a of Platform A to access the distribution directives 542 for Provider 1 Group 1A (e.g., based on metadata associated with each of the Digital Components B-D). Similar to the filtering stage 510, for example, during the selection stage 520 the secure distribution system 120 can evaluate a delivery target value, an actual delivery value, an amount of time that has elapsed in a current time period, and a length of the current time period, possibly among other factors, when generating and/or modifying a selection value. Also similar to the filtering stage 510, for example, different content platforms can specify different customization code for evaluating the various factors, and the code can be individually and securely executed to protect confidential logic of the content platforms. For example, the selection stage customization code 520a of Platform A can compare a current delivery ratio (e.g., an actual delivery value relative to a delivery target value) to a current time ratio (e.g., an amount of time that has elapsed in a current time period relative to a length of the current time period), and can generate and/or modify a selection value such that digital components are delivered at relatively even rates throughout a time period, and such that delivery targets are met without being exceeded. In the present example, since a current delivery ratio for digital components of Provider 1 Group 1B substantially matches the current time period ratio, a selection value that has been specified by a provider for a digital component (e.g., a selection value included in the digital component's selection parameters) can remain unmodified, as delivery of digital components for the group is on track to meet the delivery target value.

For Digital Component G, for example, the secure distribution system 120 can use the selection stage customization code 520b of Platform B to access the distribution directives 542 for Provider 3 Group 3A (e.g., based on metadata associated with Digital Component G). According to the distribution directives, for example, Provider 3 Group 3A has a delivery target value of 250 and an actual delivery value of 100. Since the current delivery ratio for digital components of Provider 3 Group 3A (e.g., 40%) is less than the current time period ratio (e.g., 50%), a selection value that has been specified by a provider of Digital Component G can be adjusted (e.g., increased) by the selection stage customization code 520b of Platform B, such that the digital component is more likely to be selected when comparing the selection values of the remaining candidate digital components in the pool 502b. If the current delivery ratio were to be greater than the current time period ratio, however, the selection value can be adjusted (e.g., decreased) by the selection stage customization code 520b, such that the digital component is less likely to be selected when comparing the selection values of the remaining candidate digital components in the pool 502b. By dynamically modifying selection values of digital components based on distribution directives and current delivery values, for example, delivery target values can be met over delivery time periods.

The system selects one of the remaining candidate digital components (435). For example, the secure distribution system 120 can compare the selection values of each of the remaining candidate Digital Components B-D and G in the pool 502b (that have optionally been adjusted by corresponding selection stage customization code), and can select a digital component that has a highest selection value. In the present example, the secure distribution system 120 can select Digital Component G from the pool of remaining candidate digital components 502b (here shown as selected digital component 502c).

For the selected digital component, the system executes computer code for a rendering stage customization that packages the component for presentation by a client device (440). In general, during a rendering stage 530, for a selected digital component (e.g., digital component 502c), the secure distribution system 120 can execute computer code for a rendering stage customization that has previously been received from a content platform that provided the selected digital component. In the present example, the secure distribution system 120 can execute rendering stage customization code 530b for the selected Digital Component G (e.g., a digital component that has been provided by Platform B). If one of the Digital Components B-D were to have been selected (e.g., digital components provided by Platform A), for example, the secure distribution system 120 would execute rendering stage customization code 530a.

In some implementations, the result of a rendering stage can be included in a self-contained bundle. In general, a bundle (e.g., a web bundle) can include one or more code elements that can facilitate the presentation of a digital component by a client device, and one or more code elements that can facilitate the generation and transmission of notification data (e.g., a notification related to presentation of and/or interaction with the digital component) from the client device to the secure distribution system 120. For example, the rendering stage customization code 530b can transform the selected digital component 502c into a packaged digital component 504 to be rendered inside fenced frames of the client device 110 (e.g., the client device that sent the digital component request 125 to the secure distribution system 120 during stage A). The packaged digital component 504, for example, can include presentation code elements (e.g., including HTML to define the digital component, CSS to specify layout of the digital component, JavaScript to control the behavior/interactions of the digital component, media files of the digital component, etc.), and notification code elements (e.g., notification parameters that facilitate the generation and transmission of notification data, such as an impression notification, an interaction notification, and/or a conversion notification).

The system transmits the selected and packaged digital component for receipt by a client device (445). For example, the secure distribution system 120 can transmit the packaged digital component 504 to the client device 110. After receiving the packaged digital component 504, for example, the client device 110 can use the presentation code elements included in the self-contained web bundle to present the digital component to a device user. In the present example, after the client device 110 presents Digital Component G, the client device can generate and transmit a notification 506 to the secure distribution system 120, based on the notification code elements (e.g., the notification parameters) specified in the packaged digital component 504. For example, the client device 110 can provide an impression notification in response to Digital Component G being presented by the client device. As another example, the client device 110 can provide an interaction notification in response to a user of the client device interacting (e.g., selecting, hovering over, playing, or performing another sort of interaction) with Digital Component G. As another example, the client device 110 can provide a conversion notification in response to the user of the client device performing an action (e.g., navigating to a web page, installing an application, etc.) that can be attributed to the digital component.

The system can optionally update delivery data for the transmitted digital component (450). For example, the notification 506 can include identification data that identifies the digital component that was delivered to the client device 110 (e.g., including a digital component identifier, a platform identifier, a provider identifier, and/or a group identifier), notification data that specifies a notification type (e.g., impression, interaction, conversion, or another sort of notification), and optionally, a selection value for the digital component that resulted in selection of the digital component during the selection stage 520. After receiving the notification 506, for example, the secure distribution system 120 can reference the digital component identification data included in the notification to identify corresponding distribution directive customization code for updating delivery data used to generate and/or modify the distribution directives 542. In general, generating and/or modifying distribution directives can include using a proportional-integral-derivative (PID) controller, a model based controller, or another suitable technique to compute distribution probabilities of the digital components. In the present example, the secure distribution system 120 can use the distribution directive customization code 540b for Platform B (e.g., based on the identification data included in the notification 506) to update the actual delivery value of digital components for Provider 3 Group 3A (e.g., by incrementing the actual delivery value, by adding a selection value that resulted in delivery of the digital component to the actual delivery value, or performing another suitable operation). By updating the delivery data, for example, the secure distribution system 120 can provide a customizable, closed-loop mechanism for content platforms to control the rate of digital component deliveries, without exposing user data to the content platforms, and without the computer code for controlling the delivery being executed on the servers of the content platforms.

Figure 6:
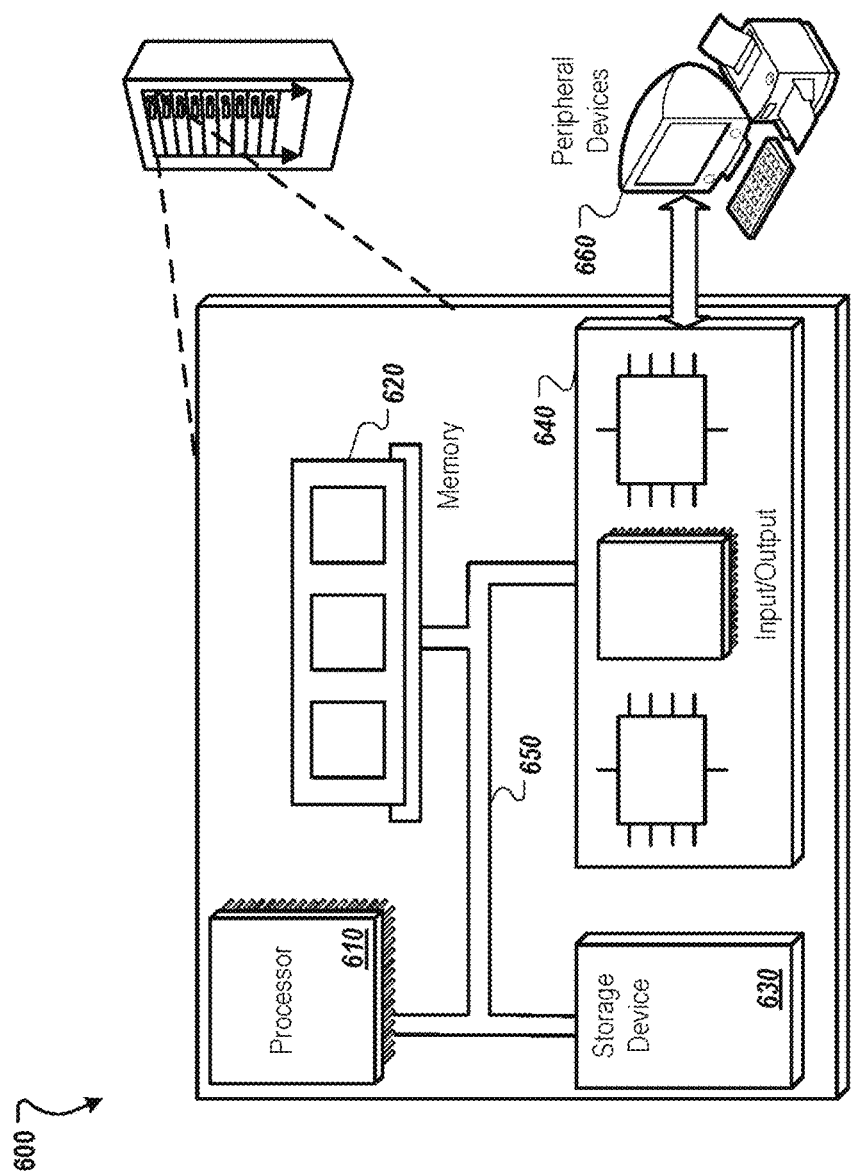
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for securely executing customized computing workflows for selecting digital components, the method comprising:
receiving, from a client device, a request for a digital component for presentation by the client device;
in response to receiving the request for the digital component, retrieving, from a repository of digital components, a pool of candidate digital components;
executing each stage of a multi-stage workflow for selecting a digital component from the pool of candidate digital components in a sequence defined by the multi-stage workflow, the executing comprising:
during a filtering stage, for each candidate digital component of the pool of candidate digital components, executing computer code for a filtering stage customization that has previously been received from a content platform that corresponds to the candidate digital component, wherein the computer code for the filtering stage customization is configured to perform filtering of digital components based at least in part on distribution directives of a provider of the candidate digital component;
after the filtering stage, during a selection stage, for each remaining candidate digital component of the pool of candidate digital components, executing computer code for a selection stage customization that has previously been received from a content platform that corresponds to the remaining candidate digital component, wherein the computer code for the selection stage customization is configured to perform generating or modifying of selection values for digital components based at least in part on distribution directives of a provider of the remaining candidate digital component;
selecting one of the remaining candidate digital components, based on the selection values; and
after the selection stage, during a rendering stage, for the selected digital component, executing computer code for a rendering stage customization that has previously been received from a content platform that corresponds to the selected digital component, wherein the computer code for the rendering stage is configured to perform packaging of the selected digital component for presentation by the client device; and
after the rendering stage, transmitting the selected and packaged digital component for receipt by the client device.

2. The computer-implemented method of claim 1, wherein the computer code for the filtering stage customization, the computer code for the selection stage customization, and the computer code for the rendering stage customization are each executed in separate virtual machines.

3. The computer-implemented method of claim 1, wherein the computer code for the filtering stage customization, the computer code for the selection stage customization, and the computer code for the rendering stage customization for a first content platform is executed in a first virtual machine, and the computer code for the filtering stage customization, the computer code for the selection stage customization, and the computer code for the rendering stage customization for a second, different content platform is executed in a second, different virtual machine.

4. The computer-implemented method of claim 1, wherein the filtering of digital components comprises (i) accessing the distribution directives of the provider of the candidate digital component, wherein the distribution directives include a target value for digital component deliveries and an actual delivery value, (ii) comparing the target value for digital component deliveries to the actual delivery value, and (iii) filtering a given digital component when the actual delivery value meets the target value for digital component deliveries.

5. The computer-implemented method of claim 1, wherein the modifying of selection values for digital components comprises (i) accessing the distribution directives of the provider of the candidate digital component, wherein the distribution directives include a target value for digital component deliveries and an actual delivery value, (ii) determining a current delivery ratio, wherein the current delivery ratio is the actual delivery value relative to the target value, (iii) determining a current time period ratio, wherein the current time period ratio is an amount of time that has elapsed in a current time period relative to a length of the current time period, and (iv) increasing the selection value of a given digital component when the current delivery ratio is less than the current time period ratio.

6. The computer-implemented method of claim 1, wherein selecting one of the remaining candidate digital components comprises selecting a given candidate digital component that has a highest selection value relative to other candidate digital components.

7. The computer-implemented method of claim 1, wherein packaging of the selected digital component comprises packaging the selected digital component with one or more code elements that facilitate presentation of the selected digital component by the client device, and with one or more code elements that facilitate a transmission of notification data for the selected digital component.

8. The computer-implemented method of claim 1, further comprising (i) receiving, from the client device, notification data associated with presentation of the selected and packaged digital component by the client device, and (ii) using the notification data to update the distribution directives of the provider of the selected and packaged digital component.

9. A system comprising:
one or more processors; and
one or more storage devices storing instructions that, when executed by the one or more processors, cause the one or more processors to perform operations comprising:
receiving, from a client device, a request for a digital component for presentation by the client device;
in response to receiving the request for the digital component, retrieving, from a repository of digital components, a pool of candidate digital components;
executing each stage of a multi-stage workflow for selecting a digital component from the pool of candidate digital components in a sequence defined by the multi-stage workflow, the executing comprising:
during a filtering stage, for each candidate digital component of the pool of candidate digital components, executing computer code for a filtering stage customization that has previously been received from a content platform that corresponds to the candidate digital component, wherein the computer code for the filtering stage customization is configured to perform filtering of digital components based at least in part on distribution directives of a provider of the candidate digital component;
after the filtering stage, during a selection stage, for each remaining candidate digital component of the pool of candidate digital components, executing computer code for a selection stage customization that has previously been received from a content platform that corresponds to the remaining candidate digital component, wherein the computer code for the selection stage customization is configured to perform generating or modifying of selection values for digital components based at least in part on distribution directives of a provider of the remaining candidate digital component;
selecting one of the remaining candidate digital components, based on the selection values; and
after the selection stage, during a rendering stage, for the selected digital component, executing computer code for a rendering stage customization that has previously been received from a content platform that corresponds to the selected digital component, wherein the computer code for the rendering stage is configured to perform packaging of the selected digital component for presentation by the client device; and
after the rendering stage, transmitting the selected and packaged digital component for receipt by the client device.

10. The system of claim 9, wherein the computer code for the filtering stage customization, the computer code for the selection stage customization, and the computer code for the rendering stage customization are each executed in separate virtual machines.

11. The system of claim 9, wherein the computer code for the filtering stage customization, the computer code for the selection stage customization, and the computer code for the rendering stage customization for a first content platform is executed in a first virtual machine, and the computer code for the filtering stage customization, the computer code for the selection stage customization, and the computer code for the rendering stage customization for a second, different content platform is executed in a second, different virtual machine.

12. The system of claim 9, wherein the filtering of digital components comprises (i) accessing the distribution directives of the provider of the candidate digital component, wherein the distribution directives include a target value for digital component deliveries and an actual delivery value, (ii) comparing the target value for digital component deliveries to the actual delivery value, and (iii) filtering a given digital component when the actual delivery value meets the target value for digital component deliveries.

13. The system of claim 9, wherein the modifying of selection values for digital components comprises (i) accessing the distribution directives of the provider of the candidate digital component, wherein the distribution directives include a target value for digital component deliveries and an actual delivery value, (ii) determining a current delivery ratio, wherein the current delivery ratio is the actual delivery value relative to the target value, (iii) determining a current time period ratio, wherein the current time period ratio is an amount of time that has elapsed in a current time period relative to a length of the current time period, and (iv) increasing the selection value of a given digital component when the current delivery ratio is less than the current time period ratio.

14. The system of claim 9, wherein selecting one of the remaining candidate digital components comprises selecting a given candidate digital component that has a highest selection value relative to other candidate digital components.

15. The system of claim 9, wherein packaging of the selected digital component comprises packaging the selected digital component with one or more code elements that facilitate presentation of the selected digital component by the client device, and with one or more code elements that facilitate a transmission of notification data for the selected digital component.

16. The system of claim 9, wherein the operations comprise (i) receiving, from the client device, notification data associated with presentation of the selected and packaged digital component by the client device, and (ii) using the notification data to update the distribution directives of the provider of the selected and packaged digital component.

17. A non-transitory computer readable medium carrying instructions that, when executed by one or more processors, cause the one or more processors to perform operations comprising:

receiving, from a client device, a request for a digital component for presentation by the client device;

in response to receiving the request for the digital component, retrieving, from a repository of digital components, a pool of candidate digital components;

executing each stage of a multi-stage workflow for selecting a digital component from the pool of candidate digital components in a sequence defined by the multi-stage workflow, the executing comprising:

during a filtering stage, for each candidate digital component of the pool of candidate digital components, executing computer code for a filtering stage customization that has previously been received from a content platform that corresponds to the candidate digital component, wherein the computer code for the filtering stage customization is configured to perform filtering of digital components based at least in part on distribution directives of a provider of the candidate digital component;

after the filtering stage, during a selection stage, for each remaining candidate digital component of the pool of candidate digital components, executing computer code for a selection stage customization that has previously been received from a content platform that corresponds to the remaining candidate digital component, wherein the computer code for the selection stage customization is configured to perform generating or modifying of selection values for digital components based at least in part on distribution directives of a provider of the remaining candidate digital component;

selecting one of the remaining candidate digital components, based on the selection values; and after the selection stage, during a rendering stage, for the selected digital component, executing computer code for a rendering stage customization that has previously been received from a content platform that corresponds to the selected digital component, wherein the computer code for the rendering stage is configured to perform packaging of the selected digital component for presentation by the client device; and after the rendering stage, transmitting the selected and packaged digital component for receipt by the client device.

18. The non-transitory computer readable medium of claim 17, wherein the computer code for the filtering stage customization, the computer code for the selection stage customization, and the computer code for the rendering stage customization are each executed in separate virtual machines.

19. The non-transitory computer readable medium of claim 17, wherein the computer code for the filtering stage customization, the computer code for the selection stage customization, and the computer code for the rendering stage customization for a first content platform is executed in a first virtual machine, and the computer code for the filtering stage customization, the computer code for the selection stage customization, and the computer code for the rendering stage customization for a second, different content platform is executed in a second, different virtual machine.

20. The non-transitory computer readable medium of claim 17, wherein the filtering of digital components comprises (i) accessing the distribution directives of the provider of the candidate digital component, wherein the distribution directives include a target value for digital component deliveries and an actual delivery value, (ii) comparing the target value for digital component deliveries to the actual delivery value, and (iii) filtering a given digital component when the actual delivery value meets the target value for digital component deliveries.

* * * * *